FIG.1.

Dec. 31, 1968   J. W. COOK   3,418,834
TEMPERATURE CONTROL SYSTEM AND METHOD FOR
OPERATING A REDUCTION ROLLING MILL
Filed Oct. 21, 1965   Sheet 2 of 13

WITNESSES:
Bernard R Giegues
James H. Young

INVENTOR
John W. Cook.
BY E. F. Possessky
ATTORNEY

DELIVERY TEMPERATURE MAXIMUM CHANGE VERSUS ACCELERATION RATE — ENTER 1900°F INITIALLY — THREAD AT 2000 FPM AND ACCELERATE AT RATE SHOWN 18 SECONDS AFTER HEAD END LEAVES S6 — DELIVER .050 INCHES FROM 1.25 INCH BAR — TOP MILL SPEED 4000 FPM — ZERO CHANGE CORRESPONDS TO 1540 °F

FIG. 20.

DELIVERY TEMPERATURE MAXIMUM CHANGE VERSUS ACCELERATION RATE — ENTER 1900°F INITIALLY — THREAD AT 2000 FPM AND ACCELERATE AT RATE SHOWN 18 SECONDS AFTER HEAD END LEAVES S6 — DELIVER .075 INCHES FROM 1.25 INCH BAR — TOP MILL SPEED 4000 FPM — ZERO CHANGE CORRESPONDS TO 1610 °F

FIG. 21.

DELIVERY TEMPERATURE MAXIMUM CHANGE VERSUS ACCELERATION RATE – ENTER 1900°F INITIALLY – THREAD AT 2000 FPM AND ACCELERATE AT RATE SHOWN 18 SECONDS AFTER HEAD END LEAVES S6 – DELIVER .100 INCHES FROM 1.25 INCH BAR – TOP MILL SPEED 4000 FPM – ZERO CHANGE CORRESPONDS TO 1665°F

FIG. 22.

DELIVERY TEMPERATURE MAXIMUM CHANGE VERSUS ACCELERATION RATE – ENTER 1900°F INTIALLY – THREAD AT 2000 FPM AND ACCELERATE AT RATE SHOWN 18 SECONDS AFTER HEAD END LEAVES S6 – DELIVER .125 INCHES FROM 1.25 INCH BAR – TOP MILL SPEED 4000 FPM – ZERO CHANGE CORRESPONDS TO 1705°F

FIG. 25. ACCELERATION VERSUS ENTRY TEMPERATURE TO HOLD CONSTANT DELIVERY TEMPERATURE (DT)– ROLLING .100 INCHES FROM 1.25 INCH BAR–THREADING AT 2000 FPM–RUNNING 600 FEET AT THREAD SPEED BEFORE INITIATING MILL ACCELERATION

FIG. 26. ACCELERATION VERSUS ENTRY TEMPERATURE TO HOLD CONSTANT DELIVERY TEMPERATURE (DT)– ROLLING .125 INCHES FROM 1.25 INCH BAR–THREADING AT 2000 FPM–RUNNING 600 FEET AT THREAD SPEED BEFORE INITIATING MILL ACCELERATION

United States Patent Office 3,418,834
Patented Dec. 31, 1968

3,418,834
TEMPERATURE CONTROL SYSTEM AND METHOD FOR OPERATING A REDUCTION ROLLING MILL
John W. Cook, Williamsville, N.Y., assignor to Westinghouse Electric Corporation, Pittsburgh, Pa., a corporation of Pennsylvania
Filed Oct. 21, 1965, Ser. No. 499,493
6 Claims. (Cl. 72—9)

ABSTRACT OF THE DISCLOSURE

A hot steel strip rolling mill is controllably accelerated to hold desired strip delivery temperature. Closed loop control of mill acceleration is based on delivery temperature detection.

---

The present invention relates to systems and methods for reduction rolling of metal or other materials, and more patricularly to accelerable hot strip reduction rolling mills in which delivery temperature of the rolled product is controlled.

It is well known that the delivery temperature of hot rolled metallic strip is a determinant of the metallurgical quality of the finished strip product. For example, low carbon steel is generally characterized with its best range of metallurgical and other properties if it is rolled from a hot bar to a delivery strip at a delivery temperature approximately in the range of 1500° F. to 1600° F. The particular delivery temperature or range of delivery temperatures at which any particular metallic material is rolled to optimize a particular property or to optimize particular groups of properties, is usually empirically determined and is dependent on the makeup of the material. By "delivery temperature," it is meant to refer to the workpiece temperature as the strip is delivered from the last hot working point such as the last stand in a hot strip mill. Coiling temperature refers to the temperature of the strip as it is being coiled on a downcoiler and is usually controlled by a water spray or other cooling means over the runout table. The strip delivery temperature and the strip coiling temperature are desirably separately controlled since they produce separate effects on the workability and other properties of the finished strip product.

Since strip delivery temperature is a significant factor in quality control of hot rolled strip and since delivery temperature can vary because of varying ambient heat losses and varying entry and operating conditions for various workpiece operations, some degree of delivery temperature determination or control is required at least to maintain the rolled product within an acceptable range of quality. In the typical conventional approach, the mill operator enters bars into the mill with an estimated or known entry temperature and geometry at a known mill speed and, by interpretation of temperature-speed prediction curves or simply by experimental expertise, the entire workpiece is rolled into strip normally without strip delivery temperature dropping below a predetermined minimum value even though the material undergoes ambient cooling throughout the rolling time. Although the entire strip may thus have generally acceptable quality, it is characterized with non-uniformity in properties and quality along its length either largely or substantially solely because the strip delivery temperature drops from the leading to the trailing strip ends. Only a relatively small portion of the strip may actually have the optimal characteristics. Further, errors in judgment as to the entry slab parameters can result in inferior rolled products which either require subsequent annealing or are totally unacceptable.

It is therefore desirable that improved control be provided for regulating the strip delivery temperature in hot strip rolling mills and particularly for holding the strip delivery temperature substantially constant so as to produce substantially uniform product quality along the rolled strip length. In accordance with the principles of the present invention, a hot strip steel or other rolling mill is controllably accelerated from a first speed toward a higher run speed to regulate the delivery temperature of rolled strip. The control system comprises a motor speed regulating arrangement for controlling the various stand motor drive speeds during continuous strip rolling. Means preferably including a delivery temperature detector is connected in closed or open loop to control adaptively or provide for controlling the speed regulation arrangement so as in turn to initiate and control mill acceleration and produce rolled strip with substantially constant optimum delivery temperature or at least within a predetermined range of delivery temperatures. Particularly in large inertia mills, the mill preferably starts at coiler threading speed and is accelerated at a relative low generally constant rate to or toward the elevated run speed, and the adaptive feedback means provides relatively small controlled changes in the mill acceleration if and as required during the strip pass. Thus, the acceleration rate is a determinant of the strip delivery temperature along the strip length, and it is manually or automatically preset or varied manually or by analog or digital feedback control to achieve delivery temperature regulation and improved overall product quality as well as improved uniformity in product quality along the strip length. In many cases, the acceleration can be initiated as the strip leaves the last stand and well before it is threaded into the coiler.

The present invention thus differs materially in its organization and its results from previously known mill control schemes where mill acceleration is employed for other purposes and/or is achieved by other means. One noteworthy prior patent example is U.S. Patent 3,109,330 issued to Barnitz et al. In the Barnitz patent, there is described an arrangement for accelerating the mill to a higher speed once the coiler is threaded. A time delay relay is actuated when the strip enters the last stand and rapid mill acceleration to a preset run speed (for example to 3000 feet per minute) is initiated after a time delay which assures threaded entry of the strip into the coiler. The central result of the Barnitz mill acceleration system is that mill productivity is improved over previous systems since operation at higher average speed cuts the time required to roll a given length of strip. The cut in rolling time also permits rolling the strip into relatively larger diameter coils. The Barnitz mill is accelerated without regulating the strip delivery temperature and further includes no feedback or other components adapted to temperature regulation purposes.

It is therefore an object of the present invention to provide a novel control system for a reduction rolling mill which efficiently operates the mill to provide improved quality and improved uniformity of quality in rolled product.

It is another object of the invention to provide a novel method for operating a reduction rolling mill so as efficiently to produce improved quality and improved uniformity of quality in rolled product.

An additional object of the invention is to provide a novel control system for a hot strip reduction rolling mill which efficiently operates the mill under open or closed loop acceleration control to regulate strip delivery temperature to a substantially constant value or within a predetermined range of values thereby to produce improved product quality and improved uniformity of product quality.

A further object of the invention is to provide a novel method for operating a hot strip reduction rolling mill so as to subject the rolled product to delivery temperature regulation by open or closed loop acceleration control and thereby produce improved product quality and improved uniformity of product quality.

It is another object of the invention to provide a novel hot strip reduction rolling mill control system which efficiently operates the mill at a starting or threading mill speed and subsequently by open or closed loop acceleration control drives the mill at a variable or constant acceleration rate to or toward an elevated mill run speed so as to produce strip delivery temperature regulation and improved product quality and improved uniformity of product quality.

It is a further object of the invention to provide a novel hot strip reduction rolling mill control system which accelerates the mill at a relatively low substantially constant acceleration rate through control of DC drive armature currents or voltages even though the field excitation levels of the DC motor drives may vary during the acceleration period.

These and other objects of the invention will become more apparent upon consideration of the following detailed description along with the attached drawings, in which.

Figure 1:
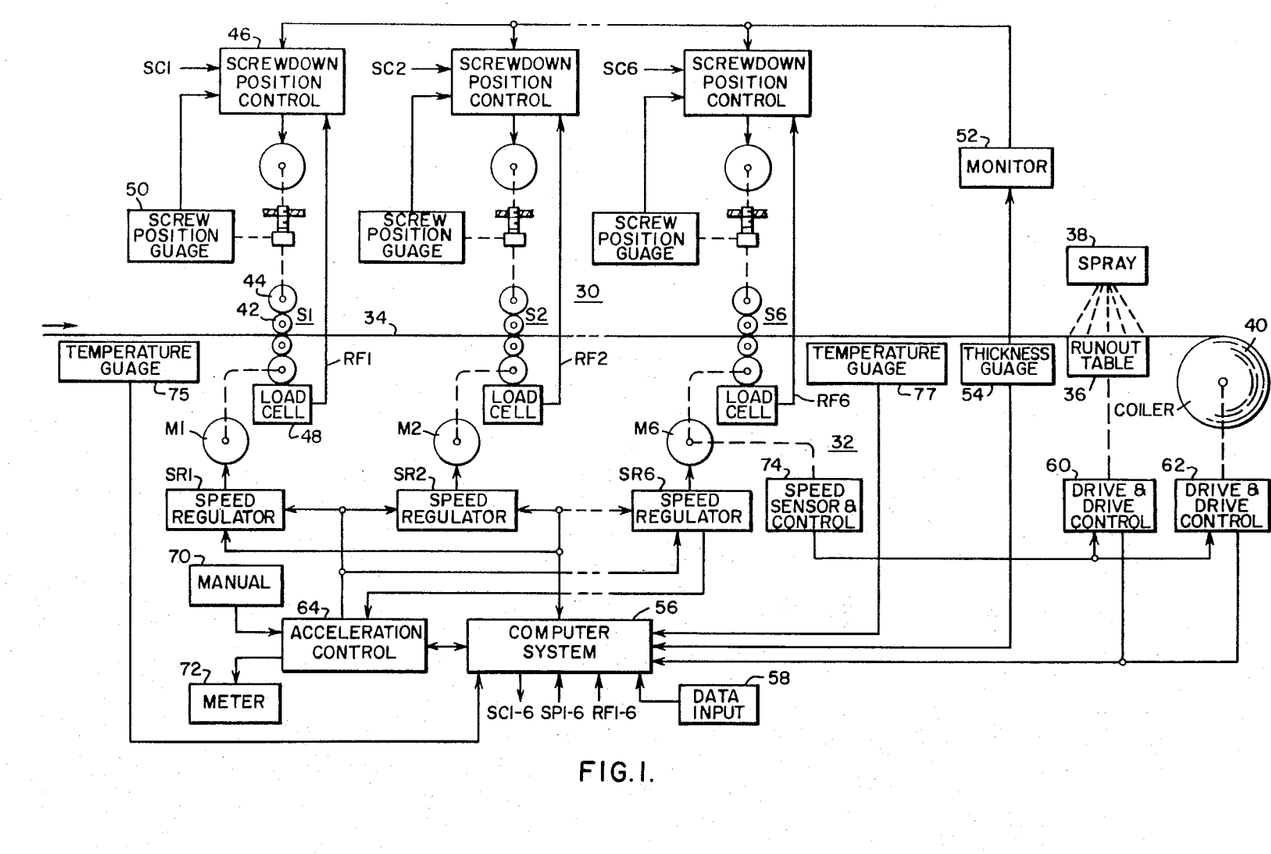
FIG. 1 shows a schematic diagram of a hot strip steel reduction rolling mill arranged and operated in accordance with the principles of the invention.

More specifically, in FIG. 1 there is shown a hot strip reduction and finishing rolling mill 30 for which a control system 32 is provided. The mill 30 includes a plurality of rolling stands S1 and S2–S6 through which strip 34 is transported for gauge reduction. A greater or fewer number of rolling stands can be provided in the mill 30 if desired. The strip 34 passes from the last stand S6 to a runout table 36 where a water spray 38 or other suitable cooling device controls the temperature at which the strip is coiled onto a downcoiler 40. In this instance, the mill 30 is a hot strip steel mill which rolls the strip 34 from bars entered into the first stand S1, but other mills can be arranged to roll steel or other plastically deformable materials in accordance with the principles of the invention.

At each stand location, a pair of work rolls 42 and a pair of backup rolls 44 are provided in a conventional manner. Respective motor drives M1–M6 are provided at the stand locations to drive the work rolls 42 and transport the strip 34 through the mill 30. The gauge reduction produced by the various work rolls 42 is set by controlling the size of the respective work roll openings through the application of the well-known roll force principle.

In this case, an analog feedback system provides stand gauge control at each stand location, and it includes a screwdown position control 46 which responds to a roll force signal generated by a load cell 48 and a screwdown position signal generated by a screwdown position detector 50 in controlling the pressure applied to the backup rolls 44 and the size of the roll opening between the work rolls 42. An analog monitor feedback system 52 responds to signals generated by a delivery thickness of X-ray gauge 54 in providing steady-state feedback gauge control at one or more of the stand locations through the associated screwdown position controls 46.

Mill acceleration or deceleration tends to make the strip gauge run light or heavy, but the gauge control subsystems can be arranged to compensate for such effects.

For more detail on the operating theory of monitor gauge control systems and stand roll force gauge control systems, reference is made to a copending application entitled "Gage Control Systems Providing Improved Gage Accuracy in a Reduction Rolling Mill," Ser. No. 484,046, now Patent No. 3,355,918, filed by J. Wallace on Aug. 31, 1965, and another copending application entitled "Slave Gauge Control System For a Rolling Mill," Ser. No. 455,111, filed by J. Wallace on May 12, 1965, both of which are assigned to the present assignee.

Other control sub-systems can be provided for the mill 30. For example, strip tension control (not shown) can be provided for holding the strip tension at the various stand locations within a predetermined range, or possibly in some applications of the invention strip tension control can be used to provide the basic gauge control. Strip profile shape control can also be suitably provided.

Each stand drive motor can be a suitably rated DC motor supplied with power subject to control by an associated regulator SR1–SR6 to provide drive speed control. For example, a static thyristor power supply can be employed and the average voltage applied to the armature of each DC motor can be regulated by thyristor firing angle control to vary the motor speed in response to detected speed error. Since it is desirable that each motor cover its speed range at rated armature voltage, shunt field excitation can be varied in each motor to hold counter EMF substantially constant at the rated value as motor speed varies. For example, respective field regulators (not shown) can be employed to lower or raise motor field strength respectively in response to detected increases or decreases in counter EMF resulting from speed regulator control of armature voltage. Field strength changes result in further motor speed change, and speed regulator control causes armature voltage to return to rated value. The response of the field regulators is normally made long as compared to that of the speed regulators so that interaction is minimized for system stability. The motor speed regulators are arranged in a conventional manner to control the motor as described. Other motor drives or drive arrangements such as variable frequency AC drives or twin drives can be employed and other motor speed regulators can be employed in accordance with the principles of the invention.

Overall mill control preferably is provided by a process computer system 56 suitably designed and programmed to provide the degree of digital process control desired. A data input device 58 such as a commercially available tape reader or the like provides initial data on strip characteristics and other system parameters. Input process variables can include signals such as screwdown position SP1–6, roll force RF1–6, delivery thickness from the thickness gauge 54, speed signals from the speed regulators SR1–SR6 and from drive controls 60 and 62 for the runout table 36 and the coiler 40.

The computer outputs can include screwdown control logic signals SC1–6 which initiate analog control by the stand and monitor gauge control sub-systems, or if desired the computer 56 can provide the necessary digital operations to provide digital feedback gauge control in place of the analog feedback gauge control previously described. The computer 56 can also provide logic control signals setting a reference speed for each stand and the speed regulators SR1–SR6 operate to maintain the reference stand speeds. Successive stand speeds are successively greater to transport the strip 34 smoothly as it is reduced in thickness. The proportional ratios of the stand speeds remain substantially constant once set for a particular workpiece pass even though the mill may accelerate or decelerate as a whole. For example, the last stand SF6 may be set to operate at a speed $s$ equal to 100% feet per minute and the first stand may operate at $0.1s$. The 10 to 1 ratio remains substantially constant throughout the workpiece pass.

In accordance with the method principles of the present invention, the strip 34 is entered into and through the mill 30 at a first or threading speed preferably until the strip 34 leaves the last stand or until the strip 34 is threaded into the coiler 40. The strip 34 loses heat during the pre-entry and the rolling time periods to provide a strip delivery temperature rundown in the conventional case, but in the present case the mill 30 is accelerated from threading speed toward or to a predetermined run speed so as to regulate delivery temperature or so as substantially to maintain a constant delivery temperature from the last stand S6, i.e. from the last hot working point. The delivery temperature is preferably held substantially constant at a predetermined value which provides optimum metallurgical product. In many applications the strip 34 is advantageously accelerated just after leaving the last stand and before entry into the coiler 40. As the workpiece pass is completed, the stands are sequentially decelerated in preparation for the next workpiece entry.

In the usual workpiece pass, strip delivery temperature rundown forms a somewhat uniform gradient, and the acceleration rate is therefore preferably continuously held at a substantially constant value once mill speed is initiated. It is also preferred that the acceleration rate be relatively small as indicated subsequently herein. However, larger acceleration rates can be employed if required and in some applications the acceleration rate can be widely modified during the workpiece pass or reversed to provide deceleration if demanded changes in the strip delivery temperature so require. To that extent, acceleration as used herein is meant to include negative or decelerative values of speed change.

Substantially constant acceleration is preferred for another reason in large inertia mills. That is, rapid fluctuations in mill speed in response to rapid strip delivery temperature changes are normally not possible in such mills. In the preferred method as applied to mills with inertia restraints, changes in acceleration rate after initiation of acceleration are limited to about plus or minus 15% or less so that uncontrollable transient effects are avoided. Additional information on the operating method of the invention is presented subsequently herein.

To effect the described mill operation, an acceleration control 64 is provided to set a mill acceleration rate reference signal for the stand speed regulators SR1–SR6. The acceleration control 64 can include a logic circuit designed to provide a plurality of output acceleration rate reference signals each associated with a particular mill acceleration rate. The preselected mill acceleration rate or the particular acceleration rate demanded by the mill control system is set by causing the acceleration control 64 to generate the appropriate acceleration rate reference signal.

Figure 4:
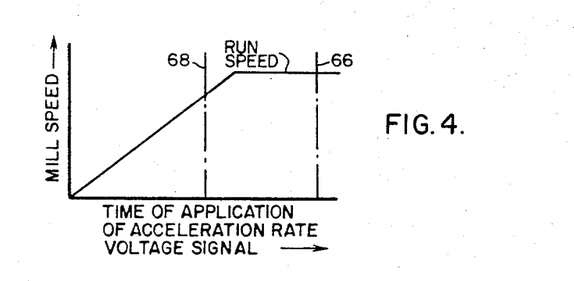
FIG. 4 shows an exemplary acceleration rate reference signal generated by the acceleration control.

As illustrated by example in FIGURE 4, each acceleration rate reference signal is equivalent to a ramp voltage, and different ramp slopes provide for different acceleration rates. If the mill is to be accelerated at a particular rate to a run speed and held at that speed until the workpiece pass is completed as indicated by the reference character 66, the acceleration rate reference signal changes from a ramp function to a constant function at the appropriate time. If the workpiece pass is completed before run speed is reached as indicated by the reference character 68, the acceleration rate reference signal comprises only a ramp voltage function. The run speed can typically be an upper limiting mill operating speed as determined by speed and load constraints on the motor drives and other mill components.

A manual input 70 or the computer 56 can set and control the mill acceleration rate through the acceleration control 64. A meter 72 at the mill operator's control panel can provide a continuous indication of mill acceleration rate.

When the stand drives are accelerated, the runout table drive 60 and the coiler drive 62 are also accelerated as by a speed sensor and acceleration control 74 coupled to the last stand motor drive M6. The sensor and control 74 is suitably arranged to produce a reference signal which causes the runout table and coiler speeds appropriately to follow the mill speed on mill acceleration or mill deceleration so as to hold coiler tension substantially constant. The sprayer 38 is suitably controlled to vary the spray action in accordance with the cooling needed to maintain desired coiling temperature as the strip 34 is coiled during the entire threading and acceleration and deceleration period of mill operation. The limit rate of spray cooling can in some cases limit the maximum mill acceleration rate.

When the computer 56 is employed to set the mill acceleration rate, a suitable entry temperature gauge 75, such as a pyrometer or the like, provides entry temperature information to the computer 56 and mill acceleration rate can be computed and then set by the acceleration control 64 so as predictively to maintain regulated or substantially constant strip delivery temperature. As strip delivery begins, a delivery temperature gauge 77 provides a delivery temperature signal to the computer 56 for adaptive feedback control of the acceleration rate reference signal set by the acceleration control 64 for delivery temperature regulation. Feedback from the acceleration control 64 to the computer 56 provides for comparison of command acceleration rate and existing acceleration rate.

If the mill operator manually operates the acceleration control 64, a suitable visual temperature indication from the delivery temperature gauge 77 provides a basis upon which to set acceleration rate manually for regulated or constant delivery temperature. A signal (not indicated) from the acceleration control 64 can also be coupled to each screwdown position control 46 at the various stands to provide gauge control compensation during periods of acceleration and deceleration.

Figure 2:
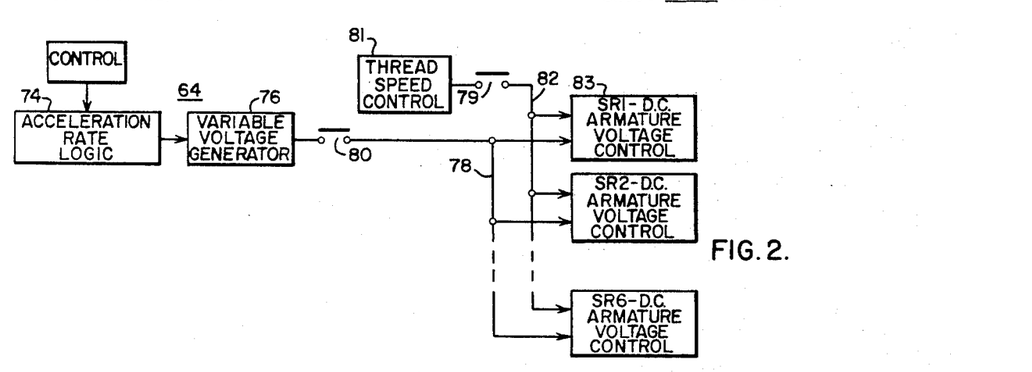
FIGS. 2 and 3 show more detailed schematic diagrams of an acceleration control employed in the mill control system of FIG. 1.

As shown in FIG. 2, the acceleration control 64 can include suitable acceleration logic 74 controlled by the manual control 70 or the computer 56 of FIG. 1. The acceleration logic 74 controls the operation of a suitably arranged variable voltage generator 76 to produce an acceleration rate reference signal on a run speed control bus 78 after closure of logic contact 80 at the start of mill acceleration. A thread speed reference signal is coupled to a thread speed control bus 82 through a logic contact 79. The thread speed reference signal can be a constant voltage but preferably is made variable by a suitable control circuit 81 so that the mill can be operated over a wide range of thread speeds. The acceleration rate reference signal is preferably applied to the bus 78 after the strip 34 has left the last stand and before or after it has entered the coiler 40, as indicated to the computer 56 by a suitable load detector (not shown) or by other means. In producing mill speed and acceleration control, the acceleration rate reference signal and the thread speed reference signal on the busses 78 and 82 are preferably additively applied to conventional armature voltage control circuits 83 associated with the respective stands. If desired, the busses 78 and 82 can also be connected to the runout table and coiler drive controls 60 and 62 to provide speed reference signals in place of the reference signal from the controller 74.

Generally, mill acceleration can be started at any time as long as the strip speed is retained in the speed range which allows threading of the strip 34 through the mill and entry of the strip head and into the coiler 40. From the standpoint of utility, earlier acceleration results in more of the head end portion of the strip 34 being subjected to temperature regulation. For example, at a threading speed of 2,000 feet per minute, mill acceleration after the strip 34 leaves the last stand and well before it enters the coiler 40 can result in additional strip temperature regulations over the time period of eighteen to twenty or more seconds it takes for the leading or head end of the strip 34 to reach and enter the coiler 40.

As the workpiece pass is completed, deceleration is produced by removing the acceleration rate reference signal from the bus 78 so that the thread speed reference signal on the bus 82 is the only signal applied to the armature voltage controls 83. The acceleration rate reference signal is also limited or removed when mill overload or other constraint conditions develop.

Figure 3:
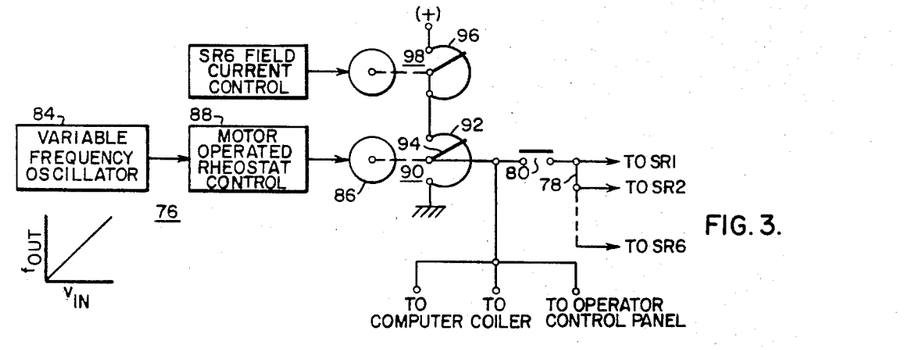

In FIG. 3, the variable voltage generator 76 is shown more specifically in the preferred form of a variable frequency oscillator 84 which responds to the acceleration rate logic 74 to operate a rheostat motor 86 through a conventional control circuit 88 and thereby generate the appropriate acceleration rate reference signal with the predetermined ramp characteristic. A rheostat 90 can have a plurality of plates or resistors connected in parallel to a power supply so as to provide respective equal output voltage signals, but in this case only one resistor 92 is indicated. A rheostat arm 94 is operated by the motor 86, and, if a plurality of rheostat plates are provided, parallel arms can be commonly driven by the motor 86. The rheostat arm 94 is connected through the logic contact 80 to the run bus 78 to apply the acceleration rate reference signal as previously described to the speed regulators SR1–SR6.

A plate resistor 96 of a motor operated rheostat 98 is preferably connected in series with the rheostat resistor 92 so as to provide constant mill acceleration for a continuously applied acceleration rate reference signal notwithstanding variations in drive motor field excitation levels as mill speed varies. For example, an acceleration rate reference signal from the acceleration logic 74 tends to produce relatively increased mill acceleration with decreasing drive motor field excitation. Changes in the field excitation level are made to control armature counter EMF as armature voltage or current is varied in the mill drive motors for regulation of the mill speed. The voltage magnitude of the acceleration rate reference signal is therefore automatically decreased for decreasing field excitation levels or increased for increasing field excitation levels by the operation of the field rheostat resistor 96 so that any acceleration rate fixed by the acceleration rate logic 74 is realized notwithstanding motor drive field excitation variations.

The acceleration rate rheostat arm 94 is also connected to the computer 56 to provide the previously described feedback signal and to the operator control panel to provide an indication of mill acceleration as previously described. The arm 94 is connected to the coiler motor drive control to provide a compensation signal for the coiler inertia once the mill is undergoing acceleration.

The variable voltage generator 76 can be provided in forms other than the preferred form of FIG. 3. For example, any suitable electronic integrator (not shown) can be employed in place of the motor operated rheostat 90. Suitable input gating circuitry can be employed for controlling the integrated voltage output level from the electronic integrator in response to input signals from the acceleration rate logic 74 or from another motor operated rheostat (not shown).

Figure 5:
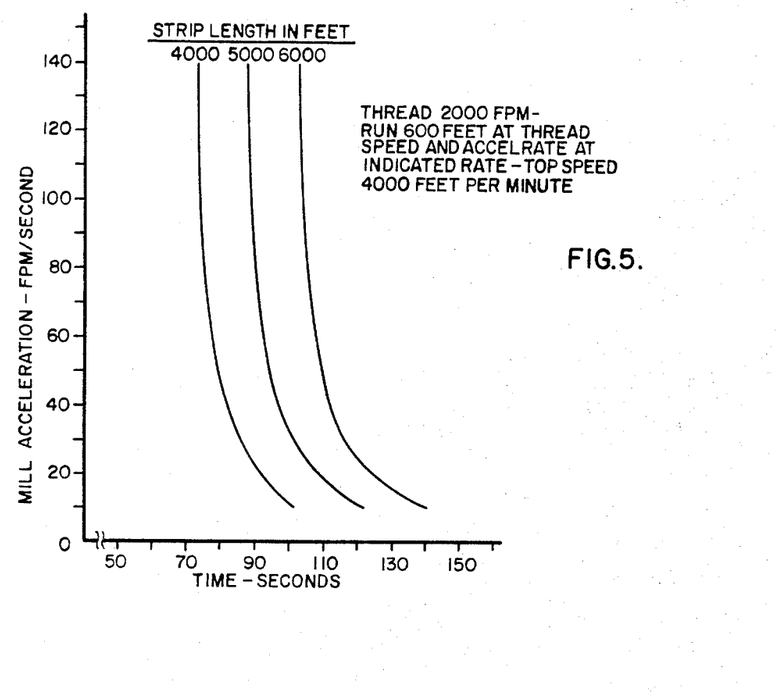
FIGS. 5–26 show various curves illustrating the operating principles upon which the invention is based.
Figure 6:
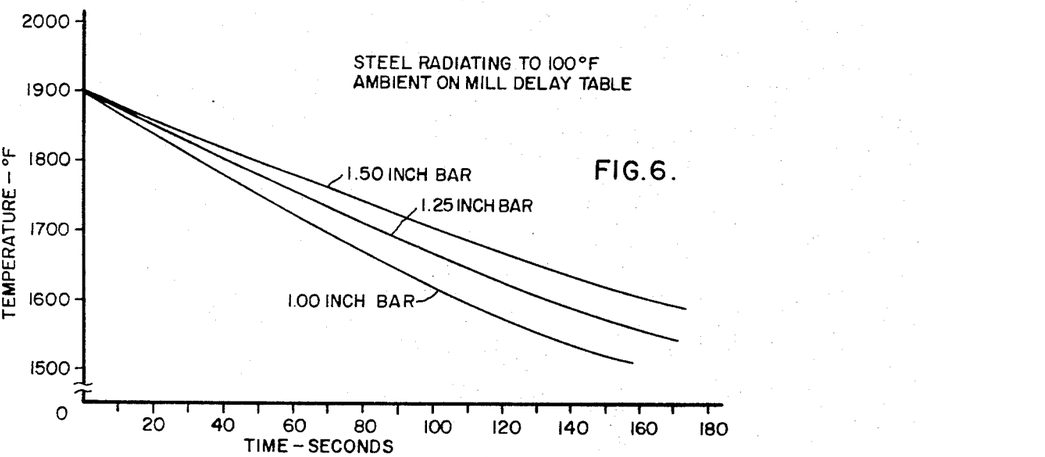
Figure 7:
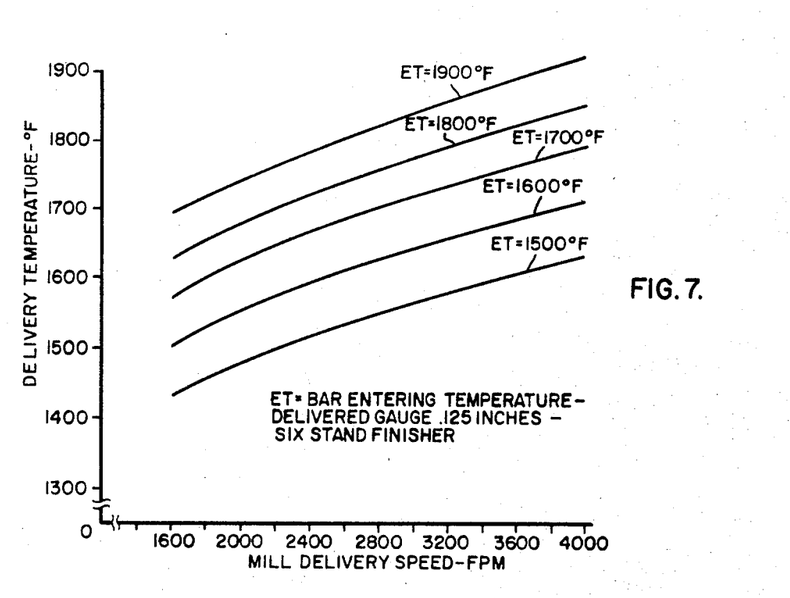
Figure 8:
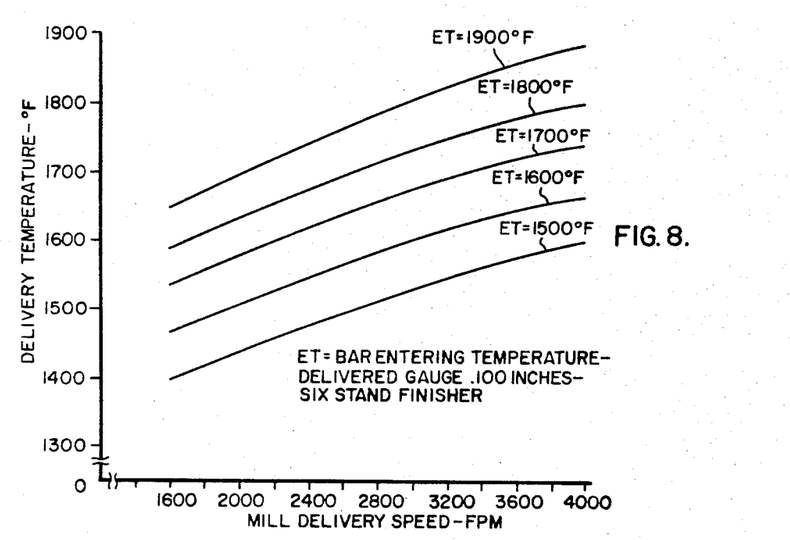
Figure 9:
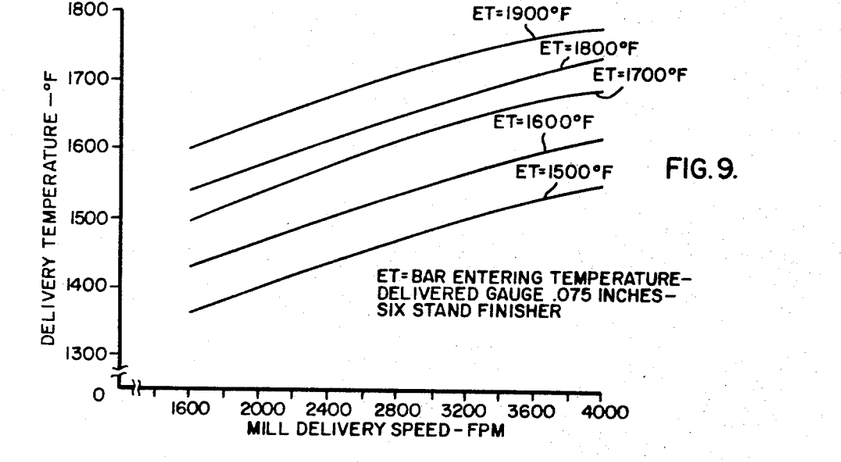
Figure 10:
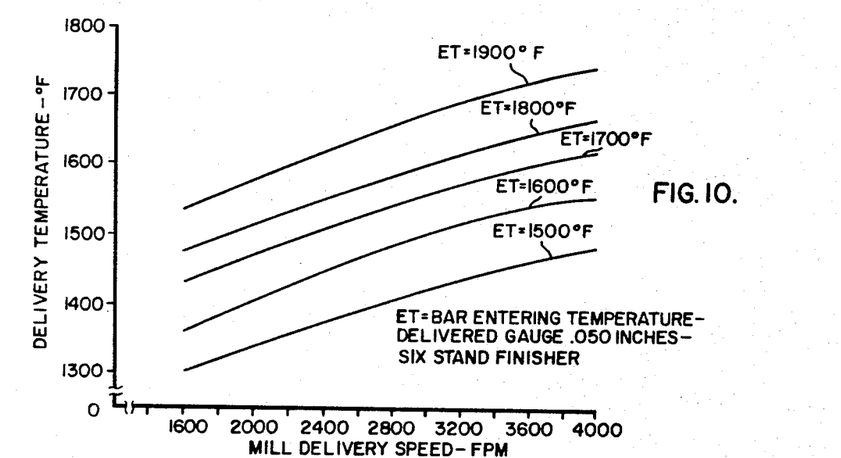

In FIGS. 5–26, there are shown curves illustrating the principles upon which the invention is based. FIG. 5 illustrates the time differential for rolling different length strips at different acceleration rates after mill threading. FIG. 6 illustrates typical empirical temperature drop curves for different gauge workpieces located on a mill entry delay table and radiating to 100° F. ambient. FIGS. 7–10 show empirical strip delivery temperature data for an entry thickness of 1.25 inches and different entry temperatures and respective delivery gauges of .125 inch, .100 inch, .075 inch and .050 inch as a function of six stand mill speed. FIGS. 5–10 together demonstrate that delivery temperature is a function of entry temperature, delivery speed, and delivery thickness. Other parameters such as entry geometry also affect delivery temperature to one degree or another.

The following prediction equations based on empirical data similar to that illustrated in FIGS. 5–10 and obtained from tests conducted by the Steel Company of Canada and described in the 1960 AISE yearbook, are descriptive of the effect of the delivery speed and thickness and entry temperature on delivered temperature:

Log $X_6$ = .516 + .716 log $X_4$ + .142 log $X_7$ + .108 log $X_8$ where:

$X_4$ = Entry temperature, °F.
$X_7$ = Delivery speed, feet per minute (f.p.m.)
$X_8$ = Delivered strip thickness, inches, and
$T_f = X_6 + 30°$ F. = Predicted finish temperature In accordance with the principles of the present invention, a general relationship between mill acceleration and delivery temperature has been developed from data such as that shown in FIGS. 5–10.

The relationship is specifically demonstrated in FIGS. 11–26. In FIGS. 11–15, the variation of strip entry temperature and delivery temperature as a function of time is shown for various mill speed operating programs. The curves are for a 1.25 inch bar rolled to .050 inch delivered gauge in a six stand finishing mill.

Figure 11:
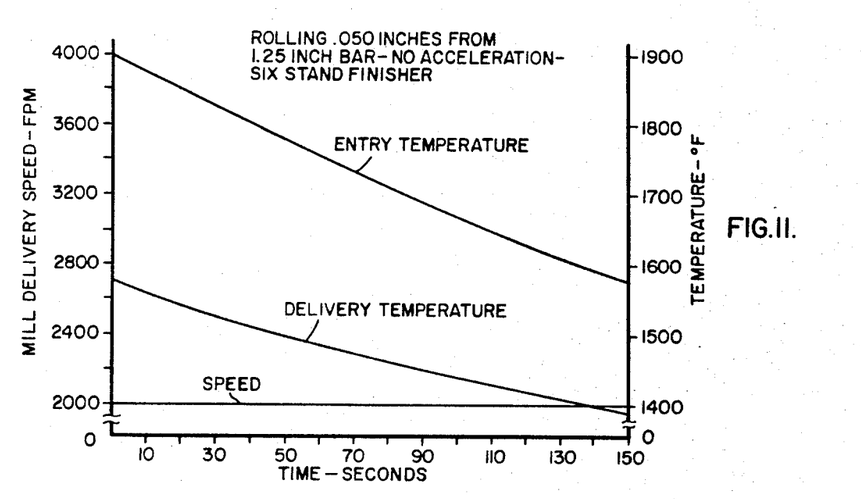

In FIG. 11, the mill is operated at a constant speed of 2,000 feet per minute which is a commonly acceptable threading speed. Delivery temperature drops substantially from the head to tail ends of the strip from approximately 1575° F. to 1380° F.

Figure 12:
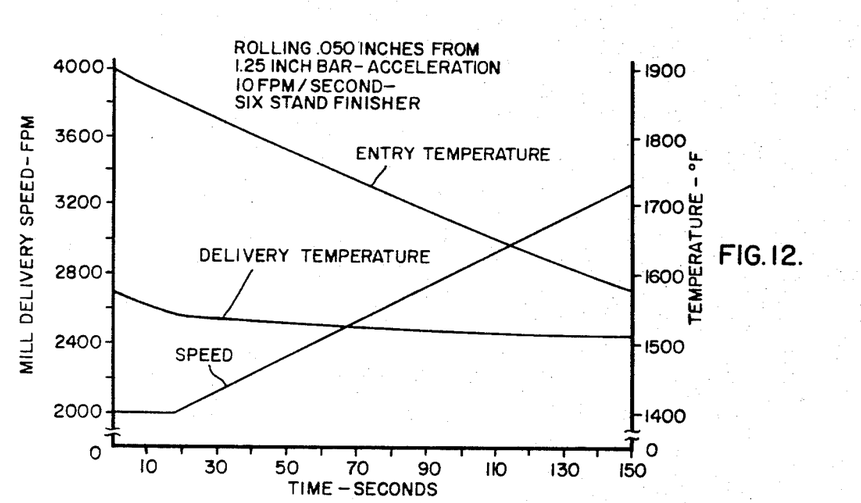

When the mill is accelerated at 10 feet per minute per second after threading is completed, delivery temperature drops to a lesser extent from 1575° F. to 1525° F. as indicated in FIG. 12. In this case, the mill does not reach a preset run speed of 4,000 feet per minute before the workpiece pass is completed.

Figure 13:
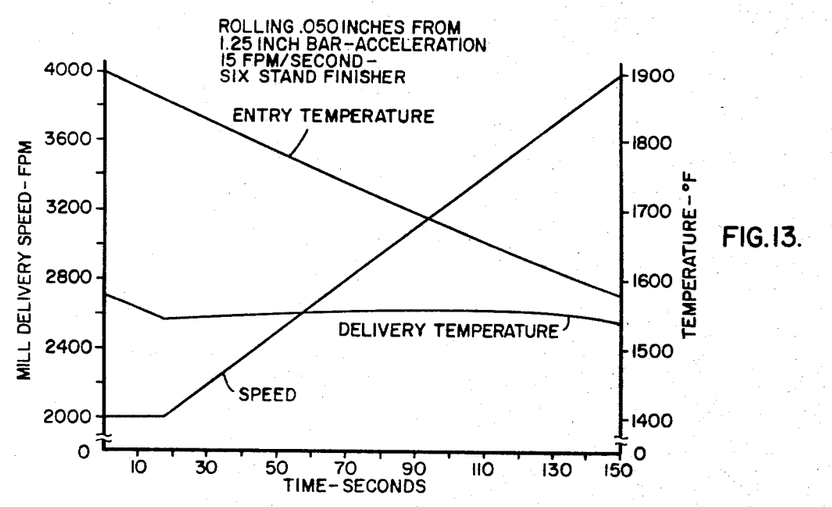
Figure 14:
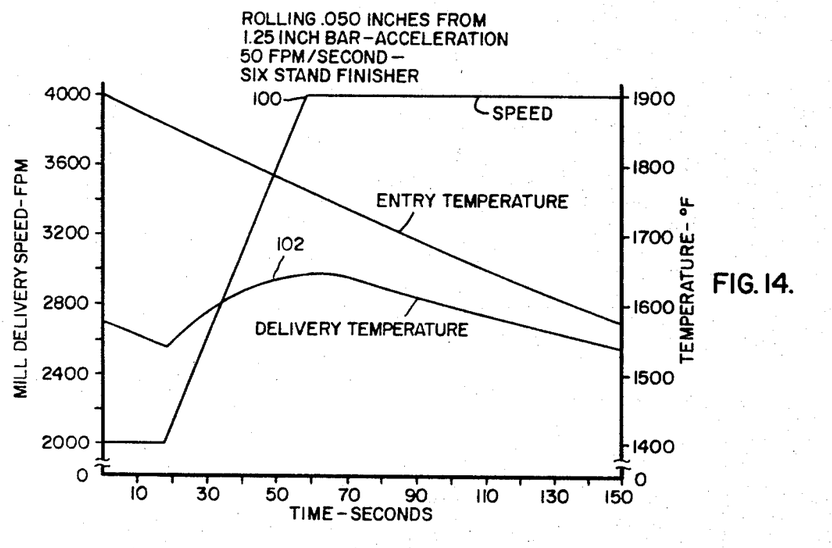
Figure 15:
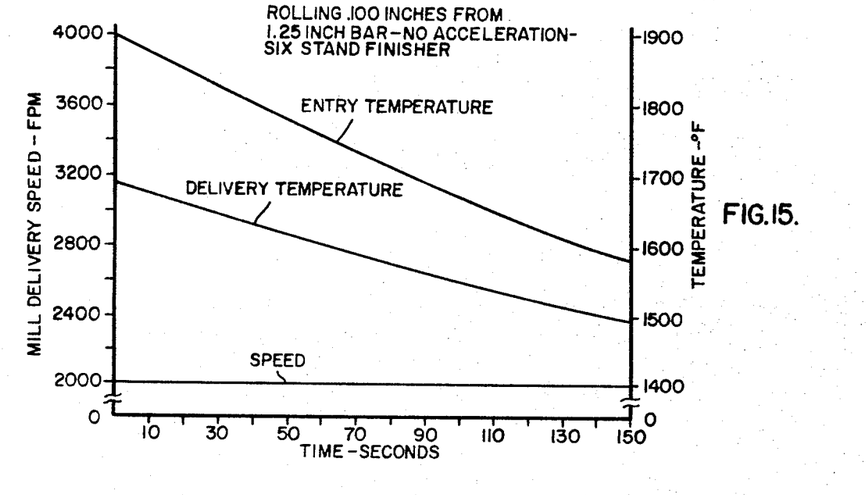

FIGS. 13 and 14 respectively show curves for acceleration rates of 15 feet per minute per second and 50 feet per minute per second. In FIG. 14, run speed is reached well before the end of the workpiece pass as indicated by reference character 100. Further, the delivery temperature undergoes a rise from the head to tail ends of the strip as indicated by the reference character 102. The temperature rise occurs when the acceleration rate is sufficiently great to offset the delivery temperature effects of dropping entry temperature and heat losses from the strip during transport through the mill.

Figure 16:
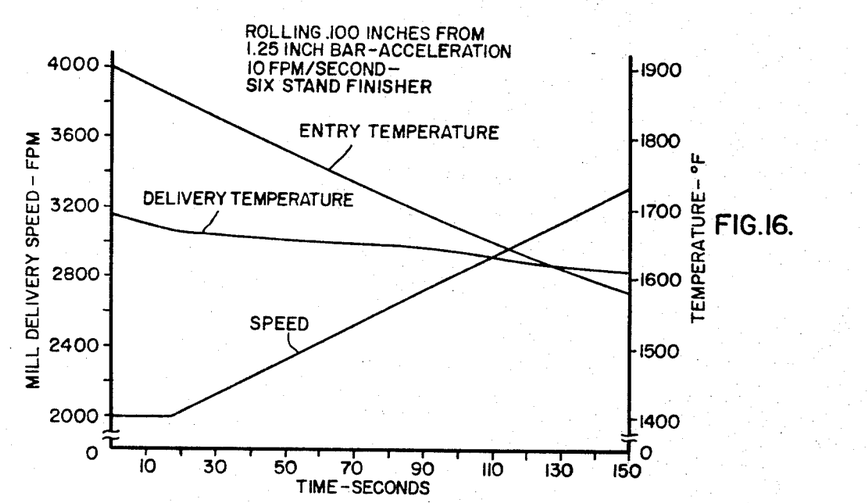
Figure 17:
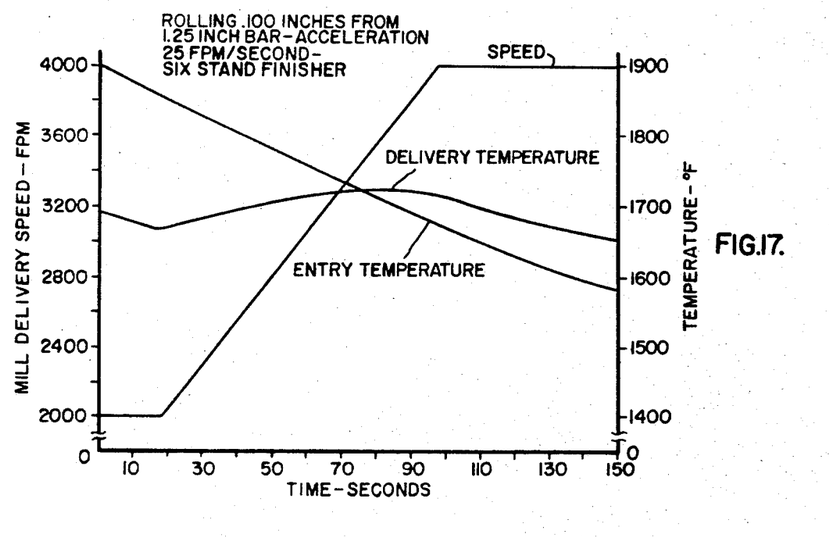
Figure 18:
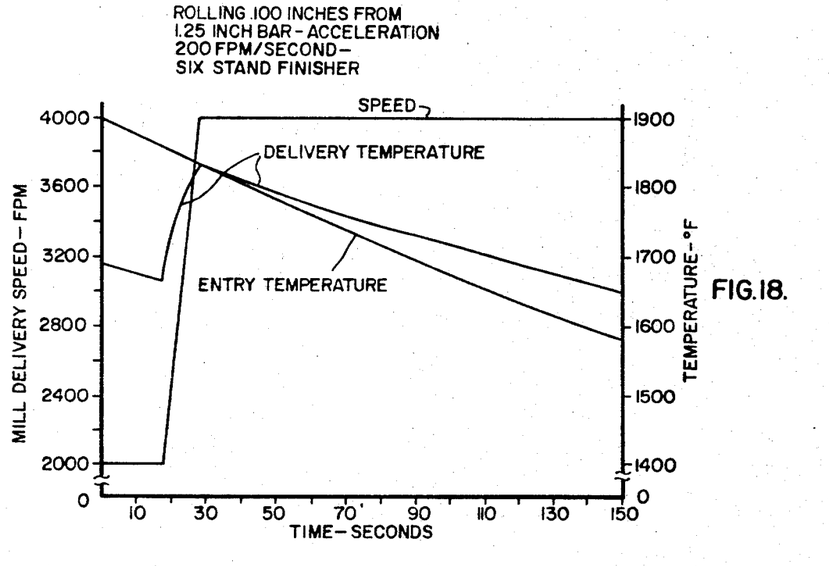
Figure 19:
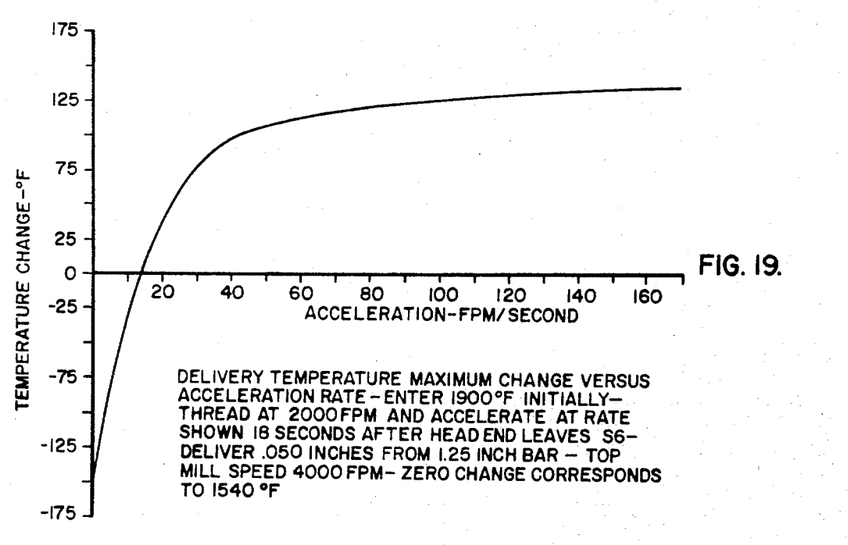
Figure 20:
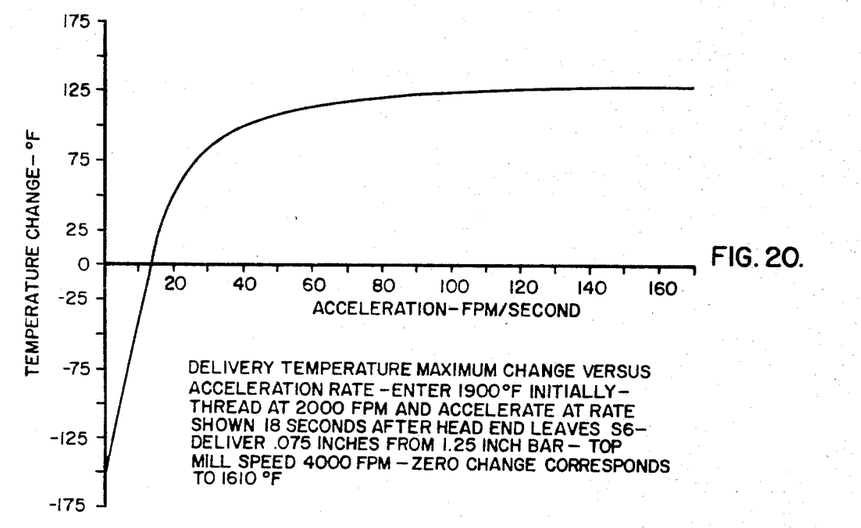
Figure 21:
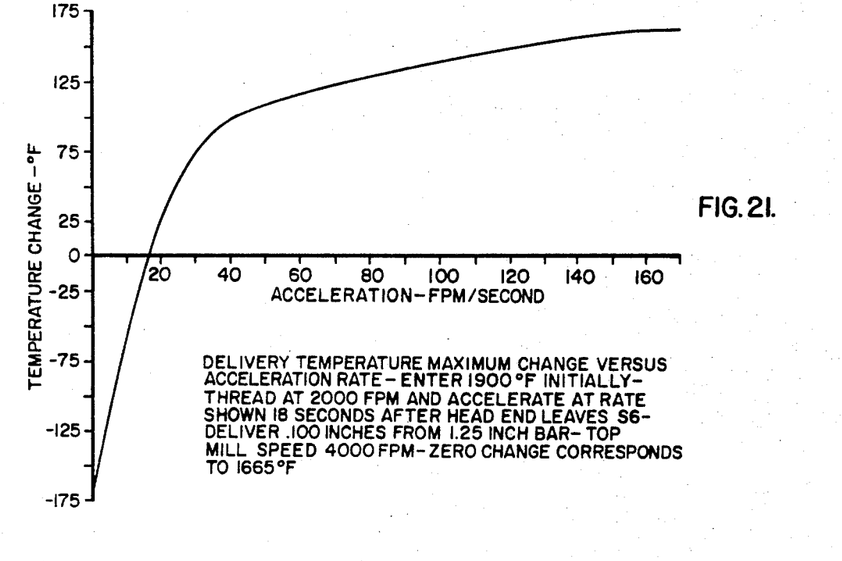
Figure 22:
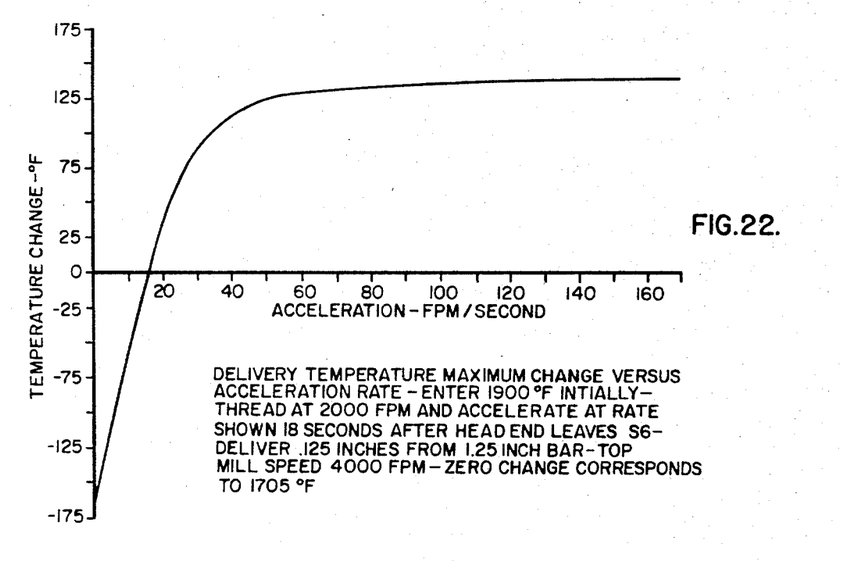
Figure 23:
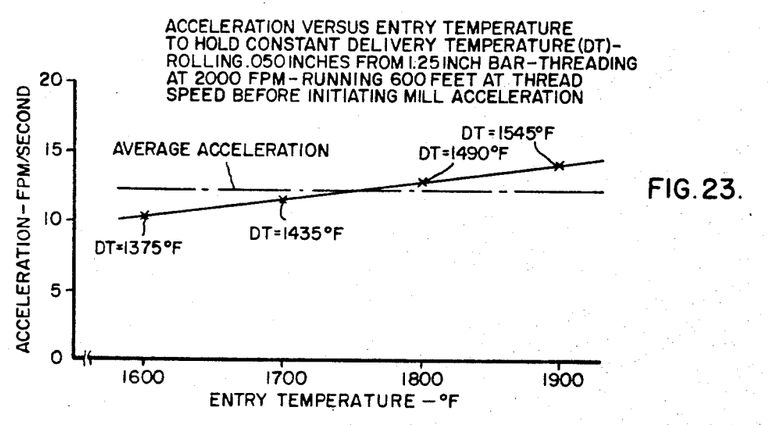
Figure 24:
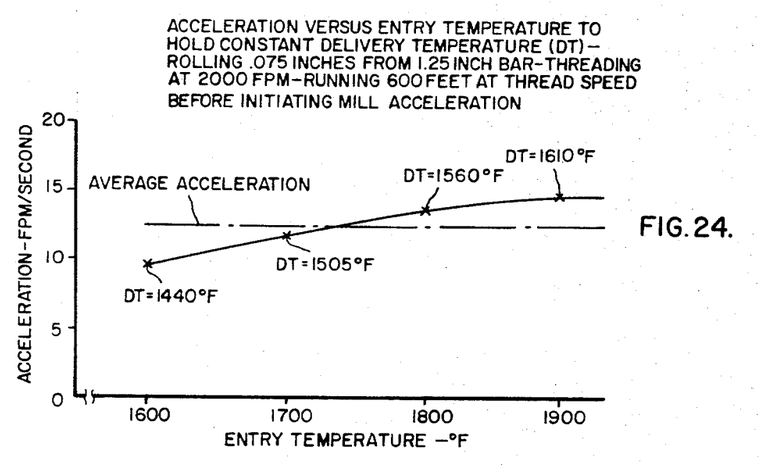
Figure 25:
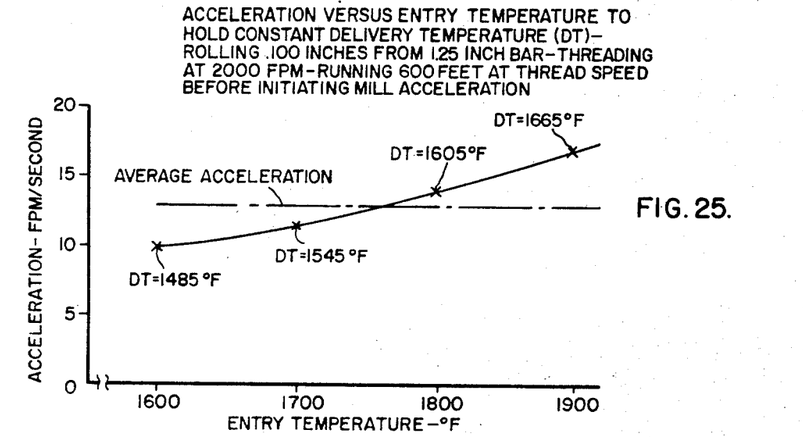
Figure 26:
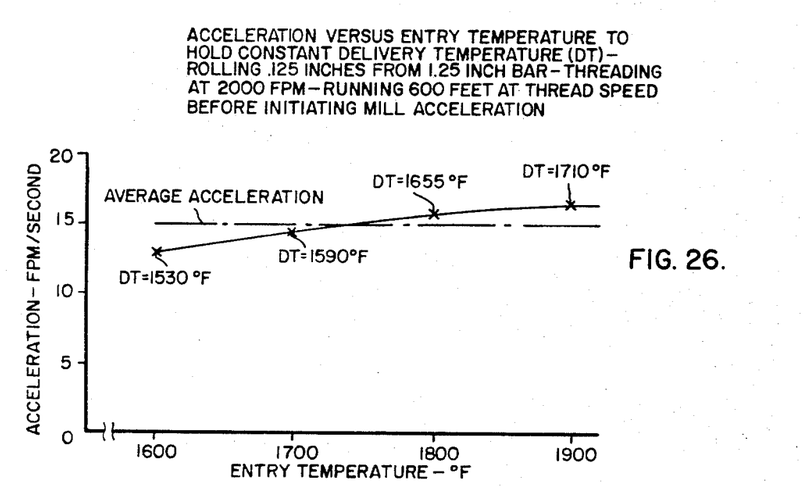

FIGS. 15–18 are similar to FIGS. 11–14 but relate to delivery gauge of .100 inch. In FIGS. 16–18, the entry temperature of certain strip portions is lower than the delivery temperature of the same portions. The temperature rise is due to heat transfer to the strip from the mill during the rolling mill process. The curve for FIG. 18 is based on an acceleration rate of 200 feet per minute per second and is presented to illustrate the delivery temperature effects of extremely high acceleration rates.

Summary curves are presented in FIGS. 19–22 to illustrate the relation between acceleration and temperature change for different delivery gauges under certain entry and other conditions. Temperature change is defined as the maximum deviation from the delivery temperature at the point in time at which mill acceleration is initiated, in this case at a point in time equal to 18 seconds after initial strip entry to the mill. Substantially constant delivery temperature is achieved, in each case of initial entry temperature of 1900° F., at acceleration rates within 10 to 20 feet per minute per second and more specifically within about 13 to 17 feet per minute per second.

In FIGS. 23–26, summary curves depict the acceleration rate required to hold constant delivery temperature at various initial entry temperatures and for different delivery gauges. The various acceleration rates required for constant delivery temperatures again substantially fall in the range of 10 to 20 feet per minute per second. Although the data from which the resultant curves of FIGS. 19–26 are projected was obtained for a six stand mill, the same curves expectedly apply to a seven stand mill or mills having other numbers of stands as long as the slope of the delivery temperature versus mill speed curves of FIGS.

7-10 remain constant from mill to mill. Acceleration rates required for delivery temperature regulation thus will vary with variation in the slope of the temperature-mill speed curves.

To achieve substantially constant delivery temperature, the mill is thus accelerated at a substantially constant and relatively low rate, preferably after threading is completed as previously indicated. The constant rate is preferably within the range of 10 to 20 feet per minute per second when the threading speed is set at about 2,000 feet per minute. Other preferable acceleration rate ranges may be required when the material being rolled has substantially different heat loss characteristics from those reflected by the illustrated curves or when heat loss conditions in a mill are such as materially to alter the temperature-mill speed curves and, accordingly, the acceleration rate required for regulated or constant strip delivery temperature. Variation in acceleration rate during a workpiece pass to achieve a substantially constant delivery temperature with widely varying operating conditions is within the scope of the invention as previously indicated.

In summary, the following formula can be used in generally setting the mill acceleration rate for constant delivery temperature:

$$A = \left[10 + 2\frac{(TE - 1600)}{100}\right]\frac{1.25}{B_T}$$

feet per minute per second where: TE=head end entering temperature to stand S1, $B_T$=nominal thickness of entering bar. The above equation can be modified as required to reflect the effect of required strip delivery gauge on the acceleration rate required for holding substantially constant delivery temperature. Other parameters may also be properly included in the equation according to the particular mill application. When mill speed is increased under acceleration control as described herein, the resultant delivery temperature control provides improved metallurgical quality and improved uniformity of metallurgical quality of the rolled product.

The foregoing description has been presented only to illustrate the principles of the invention. Accordingly, it is desired that the invention be not limited by the embodiment described, but, rather, that it be accorded an interpretation consistent with the scope and spirit of its broad principles.

What is claimed is:

1. A control system for a multistand hot strip reduction rolling mill having a DC motor drive for each stand and a speed regulator providing speed control for each DC drive through motor armature voltage control, said system comprising means for controlling the speed regulators so as to accelerate the mill from a first speed toward a higher run speed, said speed regulator control means including a motor operated rheostat generating an acceleration rate reference signal and a motor operated field rheostat in series with the first mentioned motor operated rheostat and associated with one of the motor drives and generating a voltage to compensate the acceleration rate reference signal for variations in field excitation level with mill speed changes, and means connected in a feedback path for controlling said speed regulator control means so as to control the mill acceleration and regulate the strip delivery temperature substantially within a predetermined temperature range.

2. A method for operating a multi-stand hot strip reduction rolling mill having a motor drive for each stand and means for controlling the speed of the motor drives, the steps of said method comprising operating the mill at a first speed, accelerating the mill toward a higher run speed, and controlling the acceleration rate to regulate strip delivery temperature substantially within a predetermined temperature range.

3. A mill operating method as set forth in claim 2 wherein the acceleration controlling step comprises controlling the acceleration rate to regulate strip delivery temperature substantially to a constant value.

4. A mill operating method as set forth in claim 2 wherein the acceleration controlling step comprises maintaining a substantially constant and relatively low acceleration rate subject to overload cutbacks and the like.

5. A mill operating method as set forth in claim 2 wherein the mill is a hot strip steel mill.

6. A mill operating method as set forth in claim 2 wherein the mill is a hot strip steel mill and wherein the acceleration controlling step comprises controlling the acceleration within the range of 10 to 20 feet per minute per second.

References Cited

UNITED STATES PATENTS

| | | | |
|---|---|---|---|
| 2,983,170 | 5/1961 | Slamar | 72—9 |
| 3,109,330 | 11/1963 | Barnity et al. | 72—19 |
| 3,213,656 | 10/1965 | Cook | 72—15 |
| 3,267,709 | 8/1966 | O'Brien | 72—13 |

CHARLES W. LANHAM, Primary Examiner.

A. RUDERMAN, Assistant Examiner.

U.S. Cl. X.R.

72—13